(12) United States Patent
Smith et al.

(10) Patent No.: US 11,924,031 B2
(45) Date of Patent: Mar. 5, 2024

(54) HIGHLY SCALABLE CONTAINER NETWORK INTERFACE OPERATION TO REDUCE STARTUP OVERHEAD OF FUNCTIONS

(71) Applicant: Red Hat, Inc., Raleigh, NC (US)

(72) Inventors: Douglas Smith, Bolton, VT (US); Huamin Chen, Westboro, MA (US); Ricardo Noriega De Soto, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 77 days.

(21) Appl. No.: 17/468,569

(22) Filed: Sep. 7, 2021

(65) Prior Publication Data

US 2023/0070242 A1    Mar. 9, 2023

(51) Int. Cl.
*G06F 16/23* (2019.01)
*H04L 41/00* (2022.01)
*H04L 41/0806* (2022.01)

(52) U.S. Cl.
CPC ...... *H04L 41/0809* (2013.01); *G06F 16/2379* (2019.01); *H04L 41/20* (2013.01)

(58) Field of Classification Search
CPC .. H04L 41/0809; H04L 41/20; G06F 16/2379
USPC ................................................ 709/220–222
See application file for complete search history.

(56) References Cited

U.S. PATENT DOCUMENTS

| | | | |
|---|---|---|---|
| 10,324,701 B1* | 6/2019 | Stickle | G06F 8/63 |
| 10,944,691 B1 | 3/2021 | Raut et al. | |
| 2007/0043803 A1* | 2/2007 | Whitehouse | H04L 67/12 709/201 |
| 2008/0028001 A1* | 1/2008 | Erl | G06F 8/20 |
| 2011/0084840 A1* | 4/2011 | Mercier | G08B 21/0275 340/572.1 |
| 2018/0375728 A1* | 12/2018 | Gangil | H04L 41/0853 |
| 2020/0081745 A1 | 3/2020 | Cybulski et al. | |
| 2020/0120120 A1 | 4/2020 | Cybulski | |

(Continued)

OTHER PUBLICATIONS

Microsoft. "Azure Virtual Network Container Network Interface Plug-in" (2018), 1002 pages.

(Continued)

*Primary Examiner* — Younes Naji
*Assistant Examiner* — Da T Ton
(74) *Attorney, Agent, or Firm* — Womble Bond Dickinson (US) LLP

(57) ABSTRACT

Systems and methods for providing a container network interface (CNI) specification that has been modified with a set of annotations, a set of operations, and a set of policies to provide network configuration reuse, network configuration replication, and database management (garbage collection) functionality are described. In response to receiving a request to initiate a function, whether the function is to be reused or replicated may be determined. In response to determining that the function is to be reused, calling a container network interface (CNI) plugin with a first operation that decouples database functions from network functions, so that the database can cache and reuse a network configuration generated for the function. In response to determining that the function is to be replicated, calling the CNI plugin with a second operation to create the network configuration and generate and store a template of the network configuration in the database.

17 Claims, 10 Drawing Sheets

(56) References Cited

U.S. PATENT DOCUMENTS

2020/0322231 A1* 10/2020 Llorca ................ H04L 41/0806
2021/0141655 A1   5/2021 Gamage et al.

OTHER PUBLICATIONS

Shelby Thomas, Lixiang Ao, Geoffrey M. Voelker, and George Porter. "Particle: Ephemeral Endpoints for Serverless Networking", In ACM Symposium on Cloud Computing (SoCC '20), Oct. 19-21, 2020, Virtual Event, USA. ACM, New York, NY, USA, 14 pages.

* cited by examiner ical Field

Aspects of the present disclosure relate to container-orchestration systems, and more particularly, to intelligently assigning one or more pods in a container-orchestration system.

BACKGROUND

A container orchestration engine (such as the Redhat™ OpenShift™ module) may be a platform for developing and running containerized applications and may allow applications and the data centers that support them to expand from just a few machines and applications to thousands of machines that serve millions of clients. Container orchestration engines comprise a control plane and a cluster of worker nodes on which pods may be scheduled. A pod is may refer to the most basic (smallest) compute unit that can be defined, deployed, and managed by the control plane (e.g., one or more containers deployed together on a single host). The control plane may include a scheduler that is responsible for determining placement of new pods onto nodes within the cluster. The scheduler may read data from a pod and attempt to find a node that is a good fit based on configured policies and predicates.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
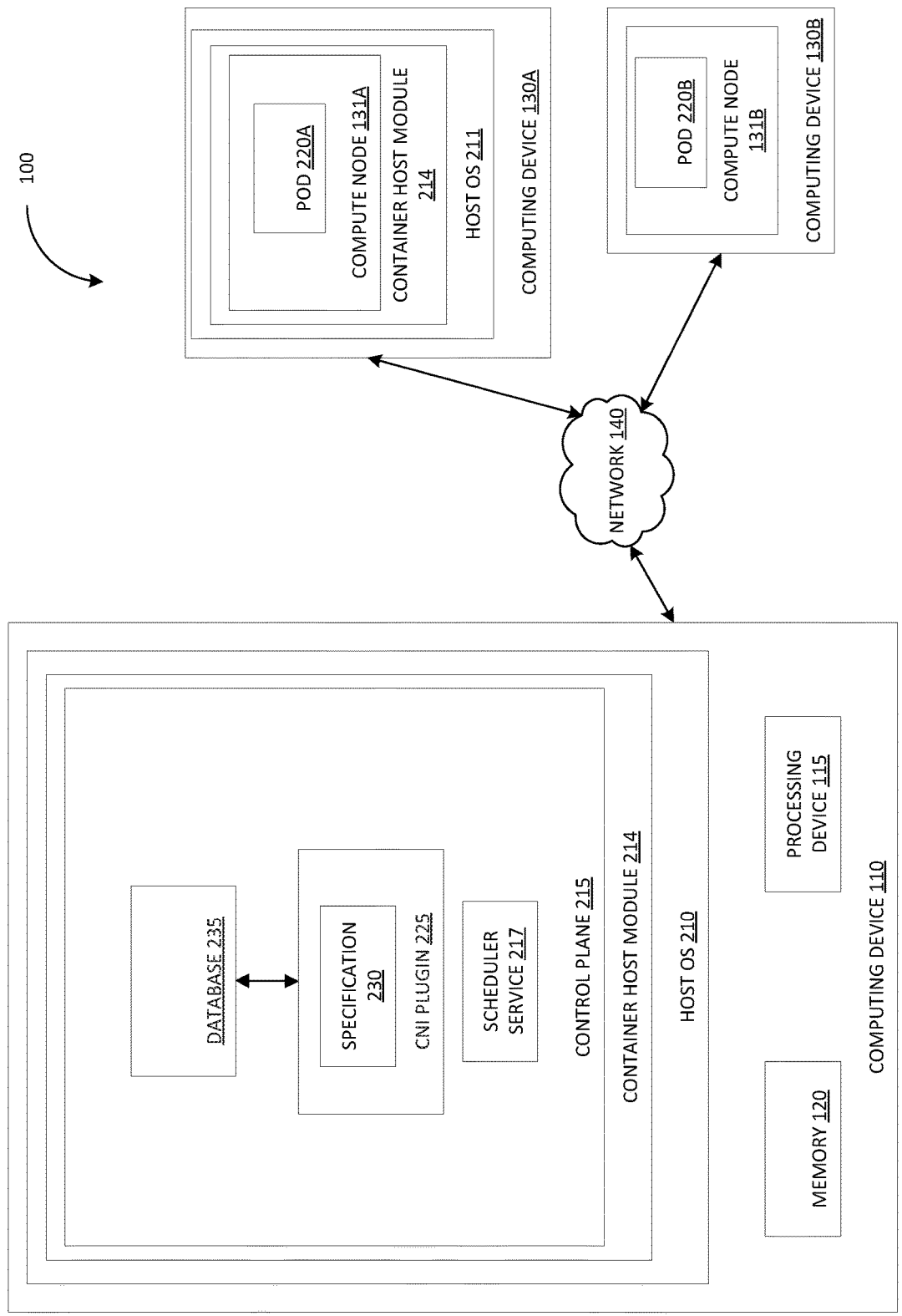
FIG. 1 is a block diagram that illustrates an example system, in accordance with some embodiments of the present disclosure.

A container host may utilize a software-defined networking (SDN) approach to provide a unified cluster network that enables communication between pods across the container host cluster. However, serverless functions are subject to a series of overhead costs such as network endpoint setup, container image pulling, and pod startup. Network endpoint setup overhead can be attributed in large part to database operations involved with creating and managing network configurations for serverless functions. Although numerous optimizations address some of the issues involved with these database operations, they are nevertheless prone to introduce long tail latencies when workload volumes spike.

Many efforts have been made to reduce function startup overhead by caching the image, reducing the image size, and reusing pods. However, these technologies only address a part of the problem, and the source of network endpoint setup overhead (bottlenecks caused by database operations involved with creating and managing network configurations) is never fully addressed. For example, some systems function to "keep serverless functions warm" by precreating the network configuration. However, this precreation still costs resources, and as serverless workloads scale and additional new pods are required, these additional new pods are not created beforehand (i.e., the creation overhead associated with the first new pod does not work for additional new pods).

The present disclosure addresses the above-noted and other deficiencies by providing a container network interface (CNI) specification that has been modified with a set of annotations, a set of operations, and a set of policies to provide network configuration reuse, network configuration replication, and database management (garbage collection) functionality. More specifically, the present disclosure addresses the above-noted and other deficiencies by using a processing device to determine, in response to receiving a request to initiate a function, whether the function is to be reused or replicated. In response to determining that the function is to be reused, the processing device may call a CNI plugin with a first operation of the set of operations to create a network configuration for the function and persist the network configuration in a database for reuse. The first operation may decouple database functions from network functions, so that the database can cache and reuse the network configuration for additional instances of the function. In this way, the number of database operations involved with creating and managing network configurations for functions are to be reused may be reduced, thereby alleviating any bottle neck created database operations associated with such functions. In response to determining that the function is to be replicated, the processing device may call the CNI plugin with a second operation of the set of operations to create the network configuration for the function and generate a template of the network configuration. A template may include compute node-independent and function-independent rules that may define the relationship between any arbitrary compute node and any arbitrary function, and the processing device may store the template in the database. When the function is to be replicated (scaled), the template may be used to generate a network configuration for each instance of the function. The use of templates in such situations is effective because when a function is to be scaled, each instance of the function is similar and the only difference is e.g., the pod or compute node on which the instance of the function will run, and thus the templates can prevent the need for large scale database operations involved with creating network configurations for each instance of the function.

FIG. 1 is a block diagram that illustrates an example system 100. As illustrated in FIG. 1, the system 100 includes a computing device 110, and a plurality of computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 130. Each computing device may include hardware such as processing device 115 (e.g., processors, central processing units (CPUs), memory 120 (e.g., random access memory 120 (e.g., RAM), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110.

Each computing device may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation. Each of computing device 110 and computing devices 130 may execute or include an operating system (OS) such as host OS 210 and host OS 211 of computing device 110 and 130 respectively, as discussed in more detail below. The host OS of a computing device 110 and 130 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 130 may each implement a compute node (e.g., as part of the container orchestration engine).

In some embodiments, a container orchestration engine 214 (referred to herein as container host 214), such as the Redhat™ OpenShift™ module, may execute on the host OS 210 of computing device 110 and the host OS 211 of computing device 130, as discussed in further detail herein. The container host module 214 may be a platform for developing and running containerized applications and may allow applications and the data centers that support them to expand from just a few machines and applications to thousands of machines that serve millions of clients. Container host 214 may provide an image-based deployment module for creating containers and may store one or more image files for creating container instances. Many application instances can be running in containers on a single host without visibility into each other's processes, files, network, and so on. In some embodiments, each container may provide a single function (often called a "micro-service") or component of an application, such as a web server or a database, though containers can be used for arbitrary workloads. In this way, the container host 214 provides a function-based architecture of smaller, decoupled units that work together.

Container host 214 may include a storage driver (not shown), such as OverlayFS, to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host 214 or a registry server. In some embodiments, the image file may include one or more base layers. An image file may be shared by multiple containers. When the container host 214 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each comprise static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

By their nature, containerized applications are separated from the operating systems where they run and, by extension, their users. The control plane 215 may expose applications to internal and external networks by defining network policies that control communication with containerized applications (e.g., incoming HTTP or HTTPS requests for services inside the cluster 131).

A typical deployment of the container host 214 may include a control plane 215 and a cluster of worker nodes 131, including worker nodes 131A and 131B (also referred to as compute machines). The worker nodes 131 may run the aspects of the container host 214 that are needed to launch and manage containers, pods, and other objects. For example, a worker node may be a physical server that provides the processing capabilities required for running containers in the environment. A worker node may also be implemented as a virtual server, logical container, or GPU, for example.

While the container image is the basic unit containers may be deployed from, the basic units that the container host 214 may work with are called pods. A pod may refer to one or more containers deployed together on a single host, and is the smallest compute unit that can be defined, deployed, and managed. There are numerous different scenarios when a new pod must be created. For example, a serverless function may need to scale. The control plane 215 may also run a scheduler service 217 that is responsible for determining placement of (i.e., scheduling) new pods onto nodes within the cluster 131. The scheduler service 217 reads data from the pod and attempts to find a node 131 that is a good fit based on configured policies. Once a suitable node 131 is found, the scheduler service 217 creates a binding for the pod that ties the pod to the particular node 131. The scheduler service 217 may consider the resource needs of a pod, such as CPU or memory, along with the health of the cluster 131, when making scheduling decisions about the pod to an appropriate node 131.

Each pod is allocated its own internal IP address, and therefore may own its entire port space. A user (e.g., via the container host module 214) may define the entry point script of a pod to instruct the pod to configure itself as a unique simulated compute node with its own IP addresses and simulated network stacks and communicate with the internal API of the control plane 215. Containers within pods may share their local storage and networking. For example, a pod may comprise a shared network namespace and all of the containers in the pod may share that same network namespace. Each pod includes an infrastructure container that holds the namespaces associated with the pod (the shared network namespace) and allows a container runtime (e.g., Podman) (not shown) to connect other containers to the pod. Although a pod may contain one or more than one container, the pod is the single unit that a user may deploy, scale, and manage.

The container host 214 may utilize a software-defined networking (SDN) approach to provide a unified cluster network that enables communication between pods across the container host 214 cluster (i.e., the compute nodes 131). This pod network may be established and maintained by a container network interface (CNI) plugin 225 (e.g., Open vSwitch (OVS)). A pod initially has no network configuration. The container runtime (not shown) may call the CNI plugin 225 (with a verb such as e.g., "create" which corresponds to a command defined by a CNI specification), which may generate a network configuration by e.g., inserting a network configuration into the shared network namespace (e.g., one end of a virtual Ethernet (veth) pair) and making any necessary changes on the host (e.g., attaching the other end of the veth into a bridge). The network configuration may comprise of a number of rules such as e.g., ingress and egress IP address assignment rules (governing e.g., whether IP address assignment is static or dynamic), rules that specify connecting to local resources in order to get instructions on how to run, rules that specify whether/how to connect to a bridge, and rules that specify whether an overlay is to be used etc.

The CNI plugin 225 may comprise a specification 230 that defines a set of operations for managing the lifecycle of network configurations. The specification 230 may define the basic execution flow and configuration format for these operations when the CNI plugin 225 is called, what the CNI plugin 225 should do with that information, and the result that the CNI plugin 225 should return. The container runtime calls the CNI plugin 225 with verbs corresponding to these operations such e.g., "create" and "delete" etc. For example, the "create" operation may create a new network configuration for a pod, and details of what is to be added (with respect to the rules of the network configuration) are passed to the CNI plugin 225 via a JSON payload.

The CNI plugin 225 may utilize a database 235 (e.g., OvS database) to manage the network configuration for each pod. When a pod is scheduled on a compute node 131, the CNI plugin updates the database 235 with the network configuration for that pod (it should be noted that the database 235 may store multiple network configurations for a single pod), and then creates the network configuration on the compute node 131. After the pod is shut down, the network configuration is removed as are the corresponding database 235 entries. However, these database operations can quickly create a bottleneck, which can be exacerbated in large scale deployments.

Figure 2A:
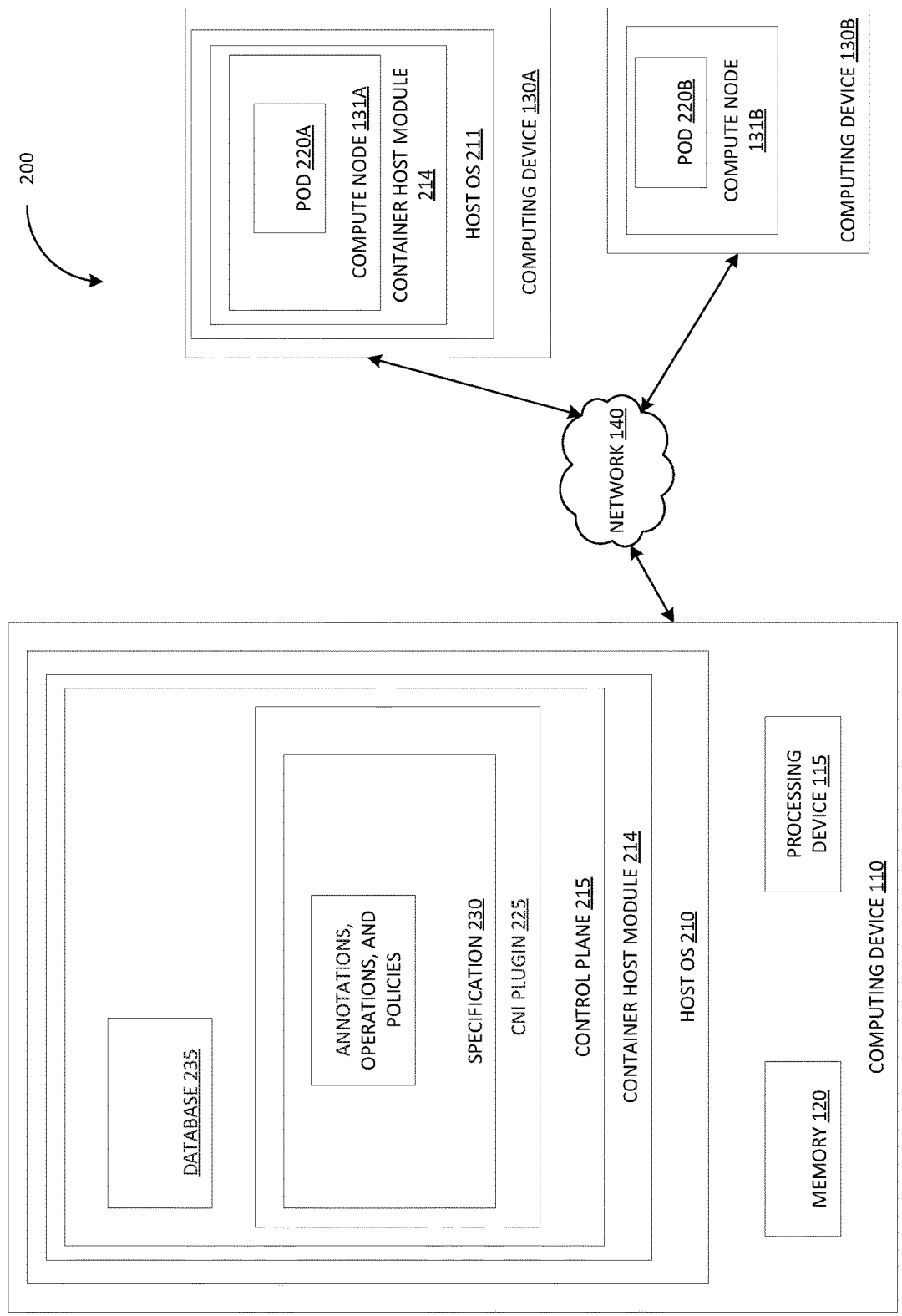
FIG. 2A is a block diagram of a system including a CNI specification modified with annotations, operations, and policies to provide network configuration reuse, network configuration replication, and garbage collection functionality, in accordance with some embodiments of the present disclosure.
Figure 2B:
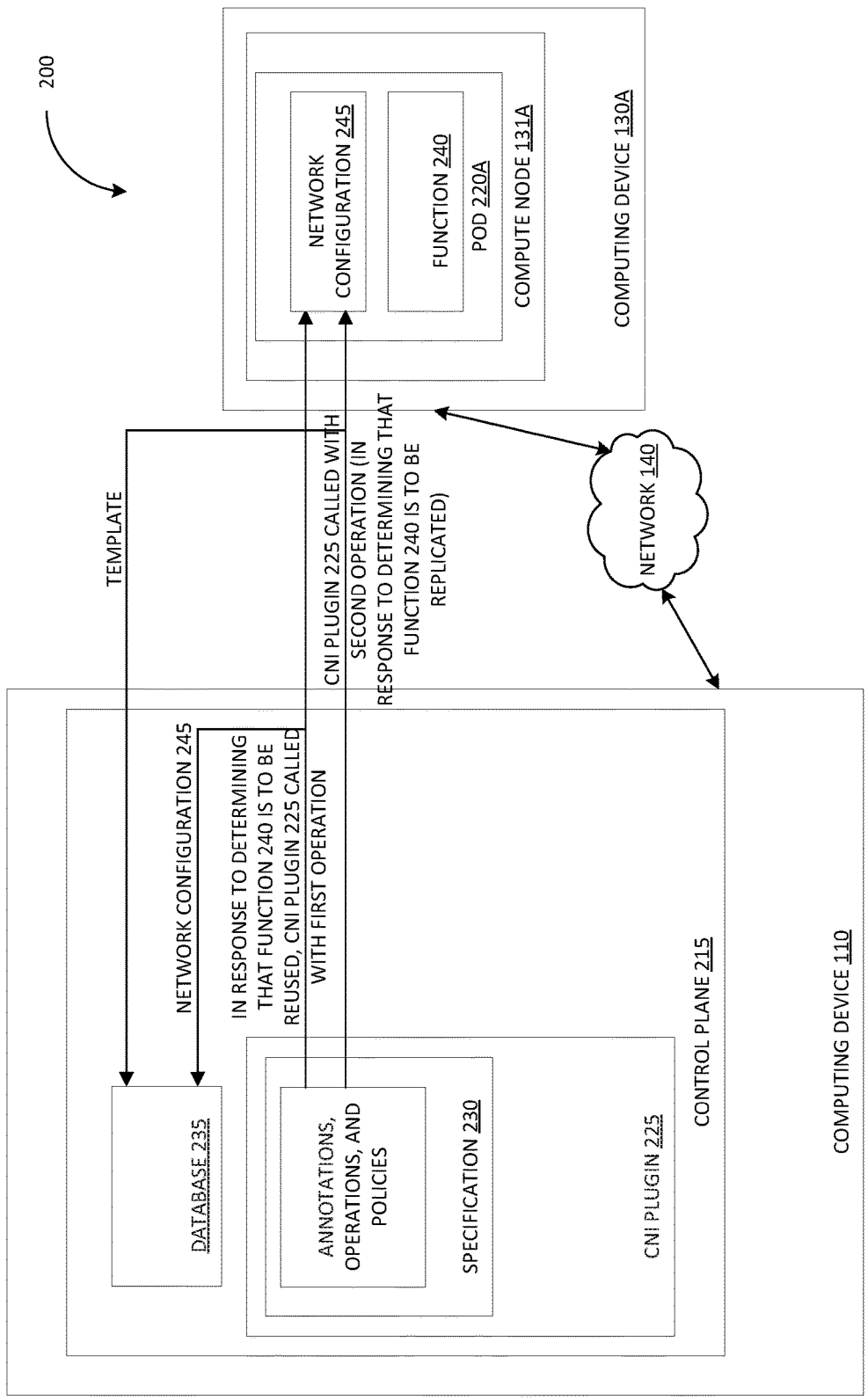
FIG. 2B is a block diagram of a system including a CNI specification modified with annotations, operations, and policies to provide network configuration reuse, network configuration replication, and garbage collection functionality, in accordance with some embodiments of the present disclosure.

FIGS. 2A and 2B illustrate a system 200 in accordance with some embodiments of the present disclosure. System 200 may be similar to system 100 described above, but the specification 230 may be modified to include a set of annotations, a set of operations, and a set of policies to provide network configuration reuse, network configuration replication, and garbage collection functionality as described in further detail herein.

The specification 230 may include operations that decouple database functions from network functions, so that the database 235 can cache and reuse the same network configurations. For example, the specification may include a "persist" operation that allows the CNI plugin 225 to create a network configuration for a function and persist the network configuration in the database 235 so that it can be reused at a later point in time. The "persist" operation decouples the persisting of the network configuration in the database 235 from the creation of the network configuration on a compute node 131, thereby allowing the database 235 to cache and reuse the network configuration for additional instances of the function. The network configuration does not need to be activated at the time it is persisted and can be activated at a later time on an as needed basis. The specification 230 may also include an "ERASE" operation to delete the network configuration from the database 235 when it is no longer needed. Because the database functions of "ERASE" operation are also decoupled from its network functions, erasure of the network configuration need not be tied to the removal of the function from the compute node 131.

The specification 230 may also include operations to allow the CNI plugin 225 to activate/deactivate existing network configurations that are currently persisted in the database 235. For example, the specification 230 may include an "activate" operation which may cause the CNI plugin 225 to activate on a particular compute node 131, a network configuration stored in the database 235. In addition, the specification 230 may include a "deactivate" operation which may cause the CNI plugin 225 to deactivate on a particular compute node 131, a network configuration stored in the database 235. It should be noted that these operations are not written to the database 235, and the database 235 is only updated once when the network configuration was initially created. Thus, when a function is called on a compute node 131, the container runtime can use a previously persisted network configuration on the compute node 131 by calling the CNI plugin with the "activate" operation. Similarly, when the function is removed from the compute node 131, the container runtime can deactivate the previously persisted network configuration by calling the CNI plugin with the "deactivate" operation. In either scenario, the network configuration may remain persisted in the database 235.

The specification 230 may also include operations to reduce network configuration setup overhead e.g., in situations where a particular serverless function is to be scaled across many compute nodes 131. For example, the specification 230 may include the "template" and "generate" operations which may allow network configurations in the database 235 to be pre-populated and substantiated at later time. More specifically, the "template" operation may generate a network configuration, and then create a template comprising an abstraction of the network configuration rules that the network configuration is comprised of (also referred to herein as meta-rules). While a normal network configuration rule may include one or more of e.g., a particular function name, compute node on which the function will run, path name, and/or pod on which the function is to execute etc., a template may include rules that are independent of any of this information and that may e.g., define the relationship between any arbitrary compute node and any arbitrary function. Stated differently, instead of having network configuration rules themselves, a template may include so-called "meta rules" which specify a predefined set of operations (that do not on their own know where to execute) and allow the template to accept as input variables one or more of e.g., the particular function name, the compute node on which the function will run, path name, and/or pod on which the function is to execute, in order to configure the template (i.e., generate an actual network configuration) for that particular use. The CNI plugin 225 may store a template in the database 235 in an inactive state and activate the template on an as-needed basis.

The specification 230 may also include a "generate" operation which may be called once the container runtime determines the input variables for a template (e.g., the particular function name, compute node on which the function will run, path name, and/or pod on which the function is to execute). In essence, the container runtime determines the input variables while the template functions to tell the database 235 that the meta-rules persisted are not the actual rules of the network configuration. The container runtime may call the CNI plugin 225 with the "generate" operation to materialize the template with the input variables to generate an actual network configuration.

For example, a template may specify an operation to "create an IP table rule for compute node X for serverless function Y," where X and Y are the unknown parameters (input variables). Once the container runtime determines the serverless function and the compute node the serverless function will execute on, it may call the CNI plugin with the "generate" operation to insert these input variables into the template to generate the IP table rule.

When a function is to be started on a pod, the container runtime of the container host 214 may determine whether a network configuration for the function is to be persisted or made into a template. The container runtime of the container host 214 may determine that the network configuration should be persisted when a limited number of instances of the function, (e.g., 1 or 2 instances) are to run (i.e., the function is to be reused). In some embodiments, a limited number of instances may correspond to the number of instances that can run on a single pod. It should be noted that reuse involves functions that are identical (e.g., the number of pods in a Kubernetes "deployment" resource). The container runtime of the container host 214 may determine that the network configuration should be made into a template when e.g., the function is going to be scaled to a large number of instances (i.e., the function is to be replicated). In some embodiments, a large number of instances may correspond to a number of instances that is greater than can run on a single pod and thus will be called many times across different pods and/or different compute nodes. Indeed, the use of templates in such situations is effective because when a function is to be scaled, each instance of the function is similar and the only difference is the pod or compute node on which the instance of the function will run. It should be noted that a template can be generated for a network configuration when the functions that the container (on which the network configuration is to be installed) will run may be different, but the way they are to be connected is similar (e.g., there are no extra interfaces needed and no different IPAM models etc. for each different process). Indeed, the scaling of a deployment is a replication action and so the network configuration of each new replica may be equal to its counterparts except for parameters such as e.g., DHCP configuration IP addresses. Thus, in one example, when a function starts for the first time, the network configuration may be persisted. Later, when more instances are started, the new instances replicate this configuration. In addition, when the function is scaled down to 0 (e.g., exits), the configuration may not be deleted and is instead persisted until the next time the function restarts.

Figure 3A:
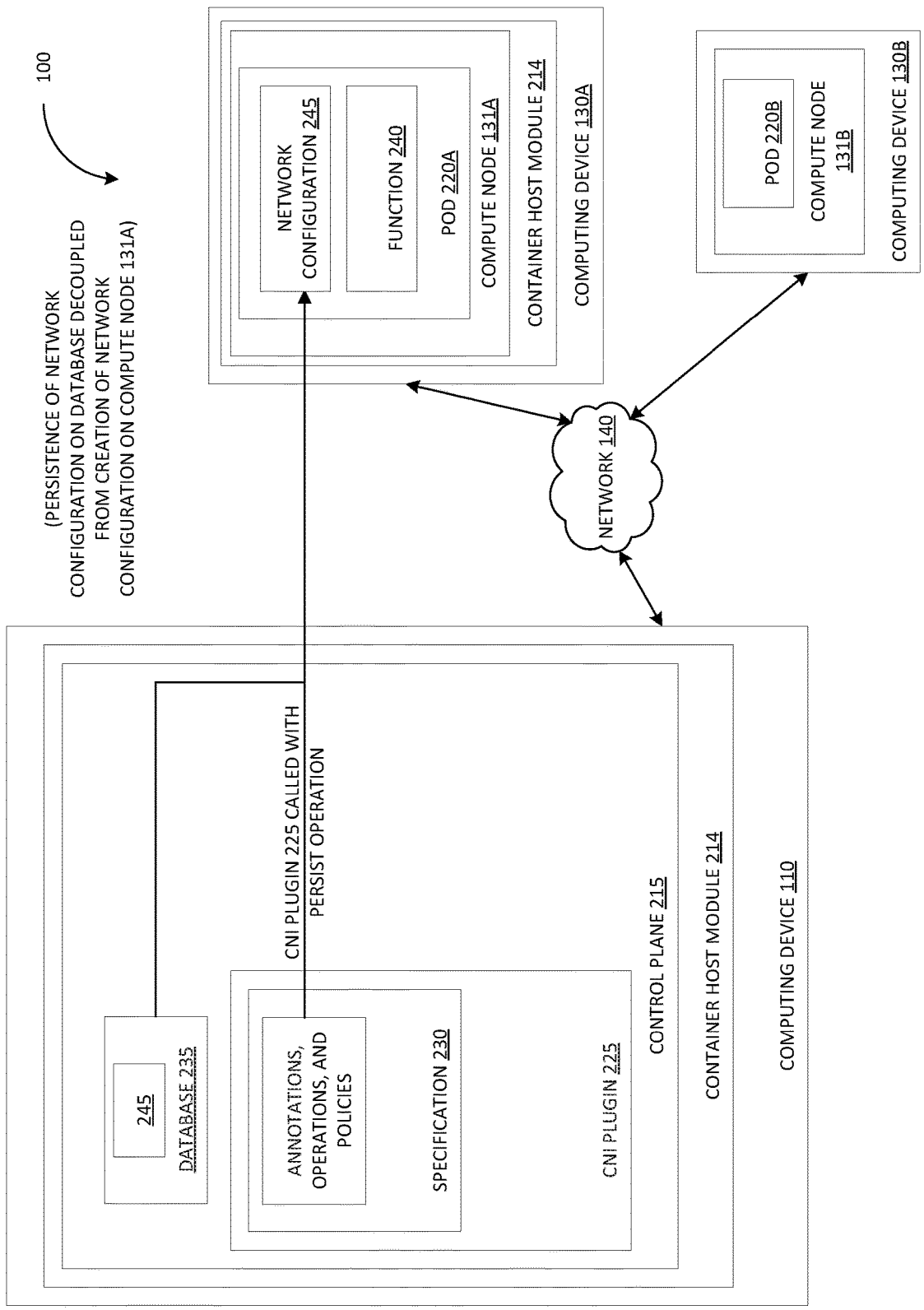
FIG. 3A is a block diagram illustrating the use of one of the operations of the modified CNI specification to create and persist a network configuration for a function, in accordance with some embodiments of the present disclosure.

FIG. 3A illustrates the system 200 in an example where the "persist" operation is used. The container host 214 may wish to start a function 240 and may determine that the function 240 will run on pod 220A on compute node 131A. The runtime of the container host 214 may determine that the function 240 is to be reused a limited number of times, and may call the CNI plugin 225 with the "persist" operation instead of a standard "create" operation. Using the "persist" operation, the CNI plugin 225 may create the network configuration 245, persist it in the database 235, and implement it on pod 220A, although the persisting of the network configuration 245 in the database 235 and the creation of the network configuration 245 on pod 220A may be decoupled. As discussed hereinabove, the network configuration 245 may be persisted in the database 235 in an inactive state and may be activated at a later time as needed.

Figure 3B:
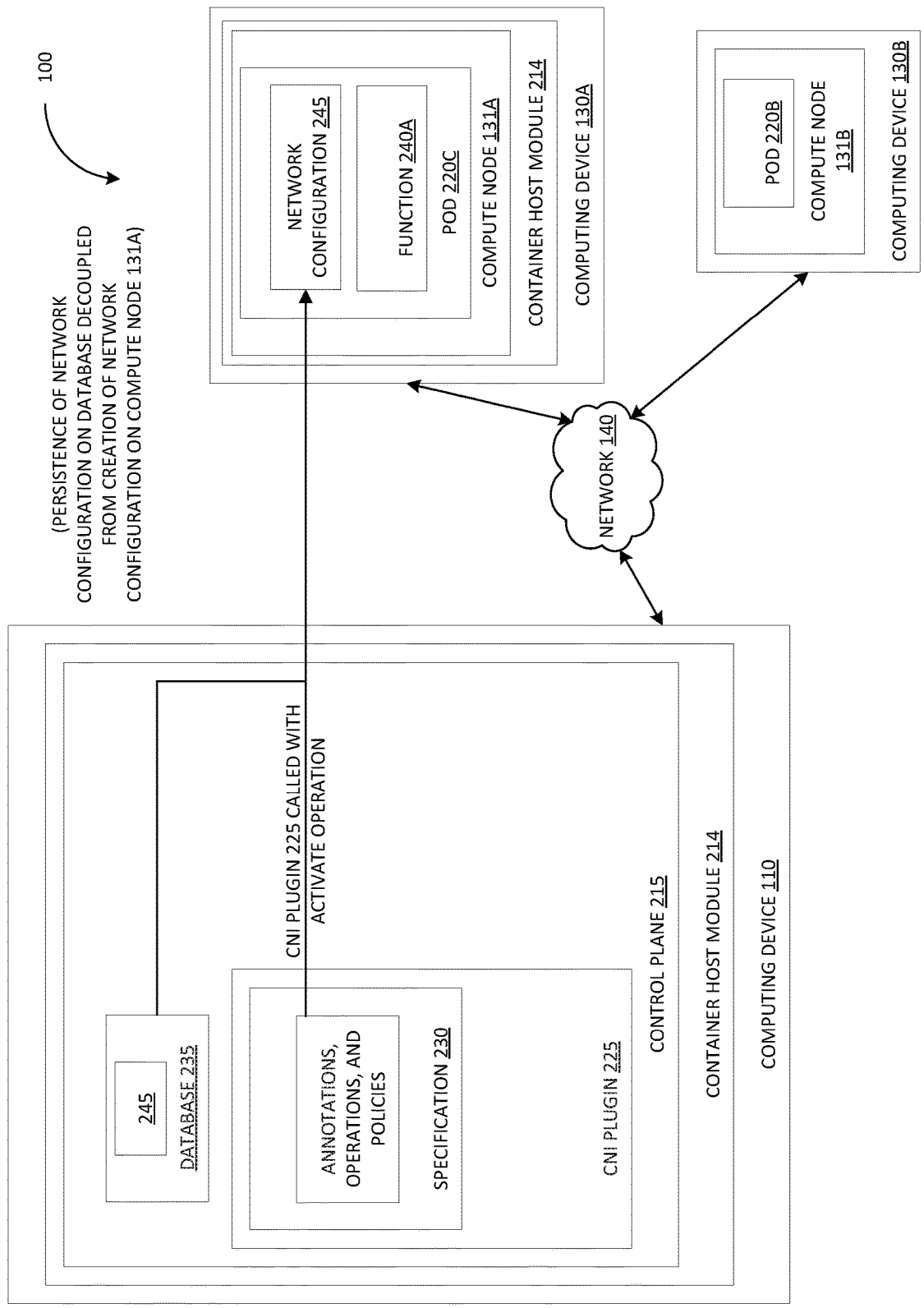
FIG. 3B is a block diagram illustrating the use of one of the operations of the modified CNI specification to generate a network configuration based on the persisted network configuration when the function of FIG. 3A is reused, in accordance with some embodiments of the present disclosure.

As shown in FIG. 3B, once the pod 220A exits, the network configuration 245 may continue to exist in the database 235. If the container host 214 wishes to start another instance of the function 240 (shown as function 240A on new pod 220C), the container runtime of the container host 214 may call the CNI plugin 225 with the "activate" operation. The "activate" operation may cause the CNI plugin 225 to activate on the compute node 131A (on pod 220C), the network configuration 245 stored in the database 235.

Figure 4A:
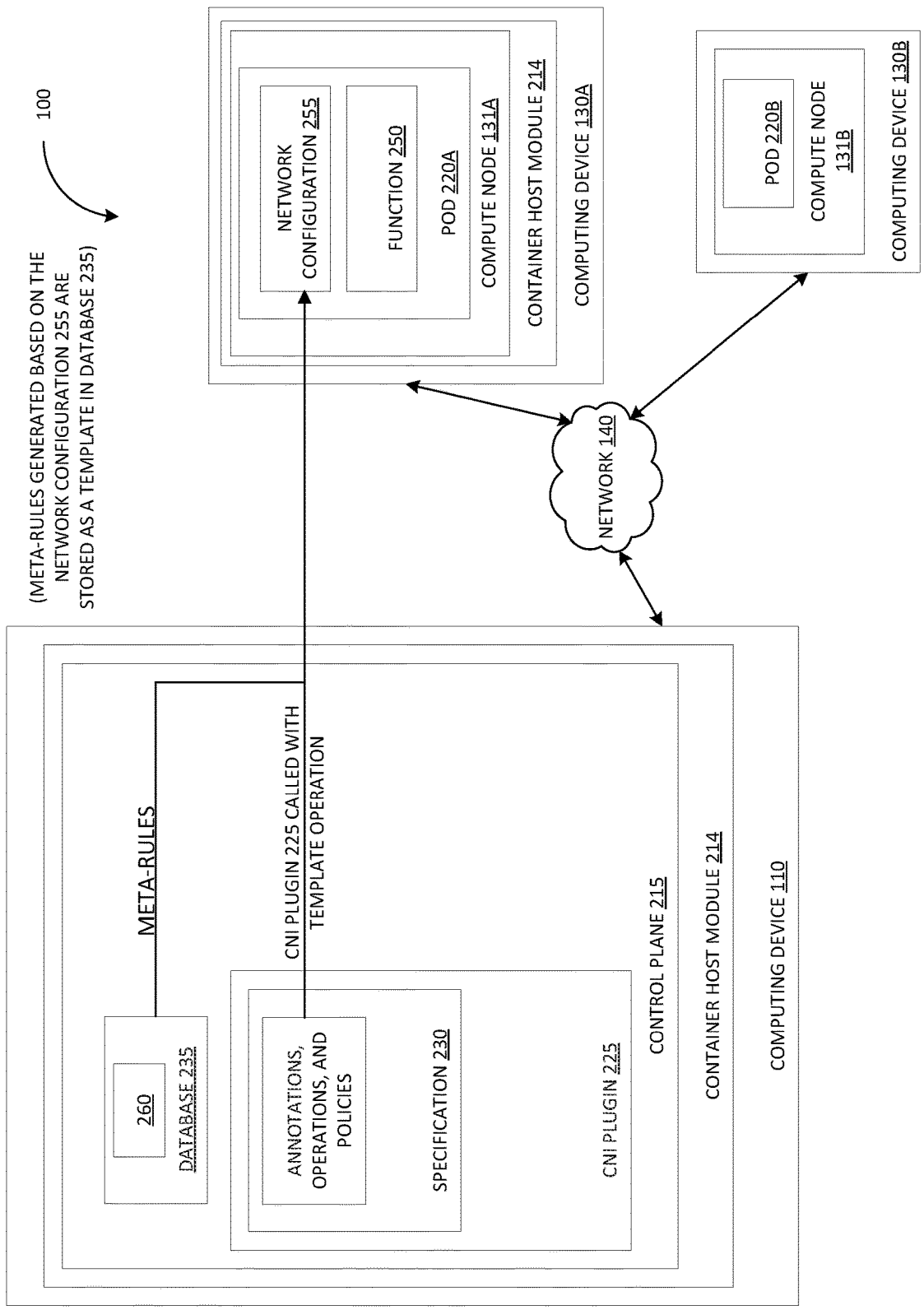
FIG. 4A is a block diagram illustrating the use of one of the operations of the modified CNI specification to generate a template based on a network configuration for a function, in accordance with some embodiments of the present disclosure.

FIG. 4A illustrates the system 200 in an example where the "template" operation is used. The container host 214 may wish to start a function 250 and may determine that the function 250 will run on compute node 131A (on pod 220A). The container runtime of the container host 214 may determine that the function is to be scaled to a large number of instances across various different compute nodes 131, and may call the CNI plugin 225 with the "template" operation instead of the standard "create" operation. Using the "template" operation, the CNI plugin 225 may create the network configuration 255, and then generate a template 260 comprising "meta rules" which specify a predefined set of operations (that do not on their own know where to execute) which are independent of a compute node on which they will execute and allow the template to accept as an input variable the compute node on which the function 250 will execute, in order to configure the template (i.e., generate an actual network configuration) for that particular use. The template 260 may then be persisted in the database 235 while the compute node 131A runs the function 250 with the network configuration 255.

Figure 4B:
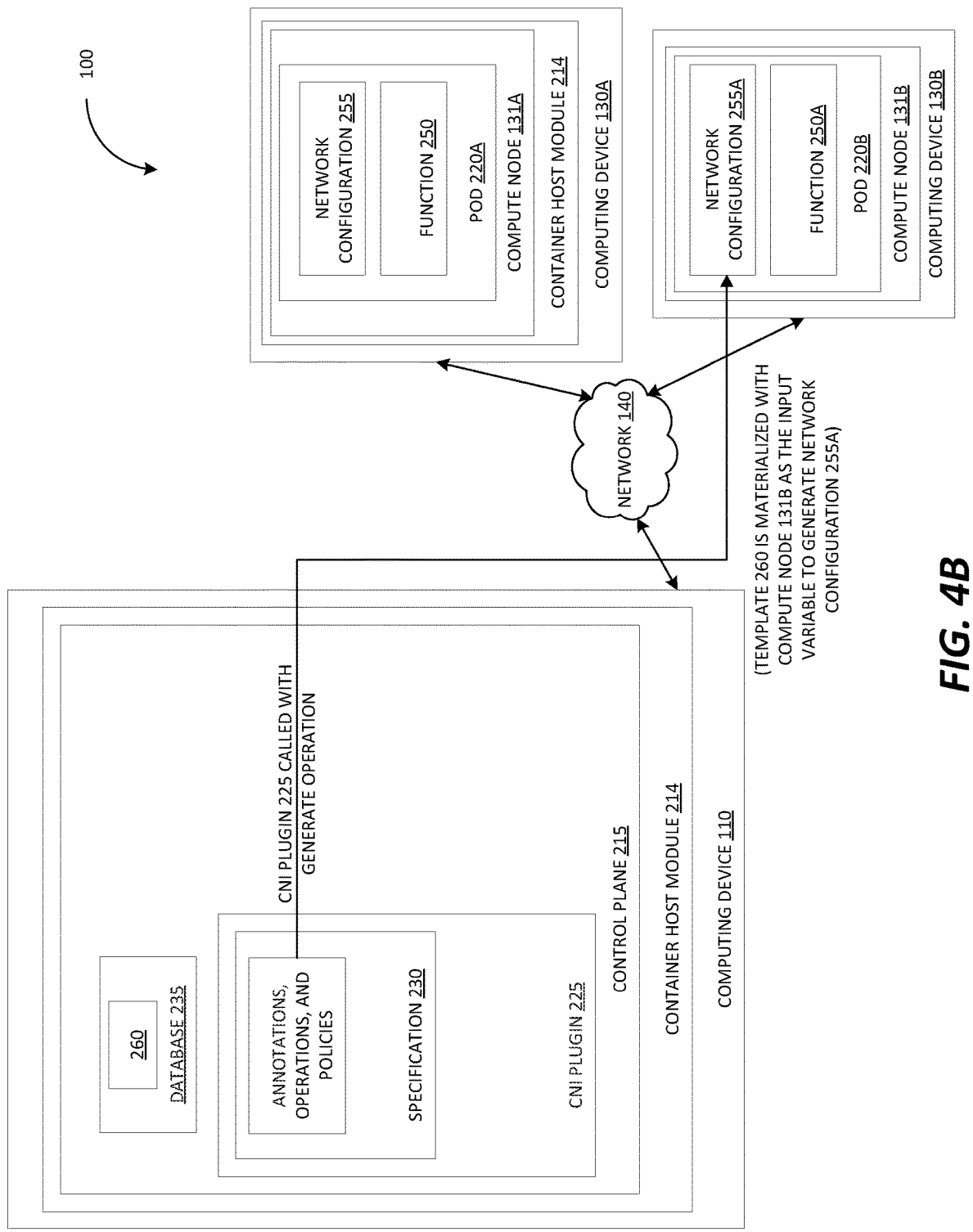
FIG. 4B is a block diagram illustrating the use of one of the operations of the modified CNI specification to generate a network configuration based on the template generated in FIG. 4A, in accordance with some embodiments of the present disclosure.

As shown in FIG. 4B, the container host 214 may wish to start a second instance of the function 250 (shown as function 250A) and upon determining that the function 250A is to be started on compute node 131B (on pod 220B), the container runtime of the container host 214 may call the CNI plugin 225 with the "generate" operation and specify the compute node 131B. Using the "generate" operation, the CNI plugin 225 may materialize the template 260 with the compute node the function 250A is to be started on (i.e., compute node 131B) to generate an actual network configuration 255A on compute node 131B (on pod 220B). In this way, the container runtime of the container host 214 may generate a network configuration for any number of instances of the function 250 across any number of compute nodes 131.

In some embodiments, the Kubernetes autoscaler may be instructed to annotate functions to generate network configuration rules based on a template. The Kubernetes autoscaler may apply the annotation on every relevant function, but the CNI plugin 225 may process the annotation of each function in different ways. When a function is annotated with an instruction to generate network configuration rules based on a template, the CNI plugin 225 first checks if network configuration templates exist. The first time the function starts, since the template has not been created yet, the CNI plugin 225 creates such a template. When a replica of the function starts, the CNI plugin 225 reads the template annotation again and finds the created template, the CNI plugin 225 then generates the network configuration rules based on the created template. In this way, a full set of network configuration rules can be generated in the database 235 in a single operation.

The specification 230 may also include a database management policy, which provides criteria for when an entry in the database 235 (e.g., a network configuration or template) should be erased. In accordance with the database management policy, the processing device 115 may analyze each of the plurality of entries in the database to determine one or more entries that are not associated with an active function (e.g., by looking at the serverless function path). The processing device 115 may erase each entry that is not associated with an active function. The database management policy may also provide criteria regarding the amount and complexity of the rules in the database 235, and if the number or complexity exceeds the criteria, then certain rules may be erased. In some embodiments, the database management policy may alternatively or in addition to other criteria, instruct the processing device 115 to analyze each of the entries in the database 235 to determine one or more entries that have been activated/materialized more than a threshold number of times. The processing device 115 may erase each entry that has been activated/materialized more than the threshold number of times.

Figure 5:
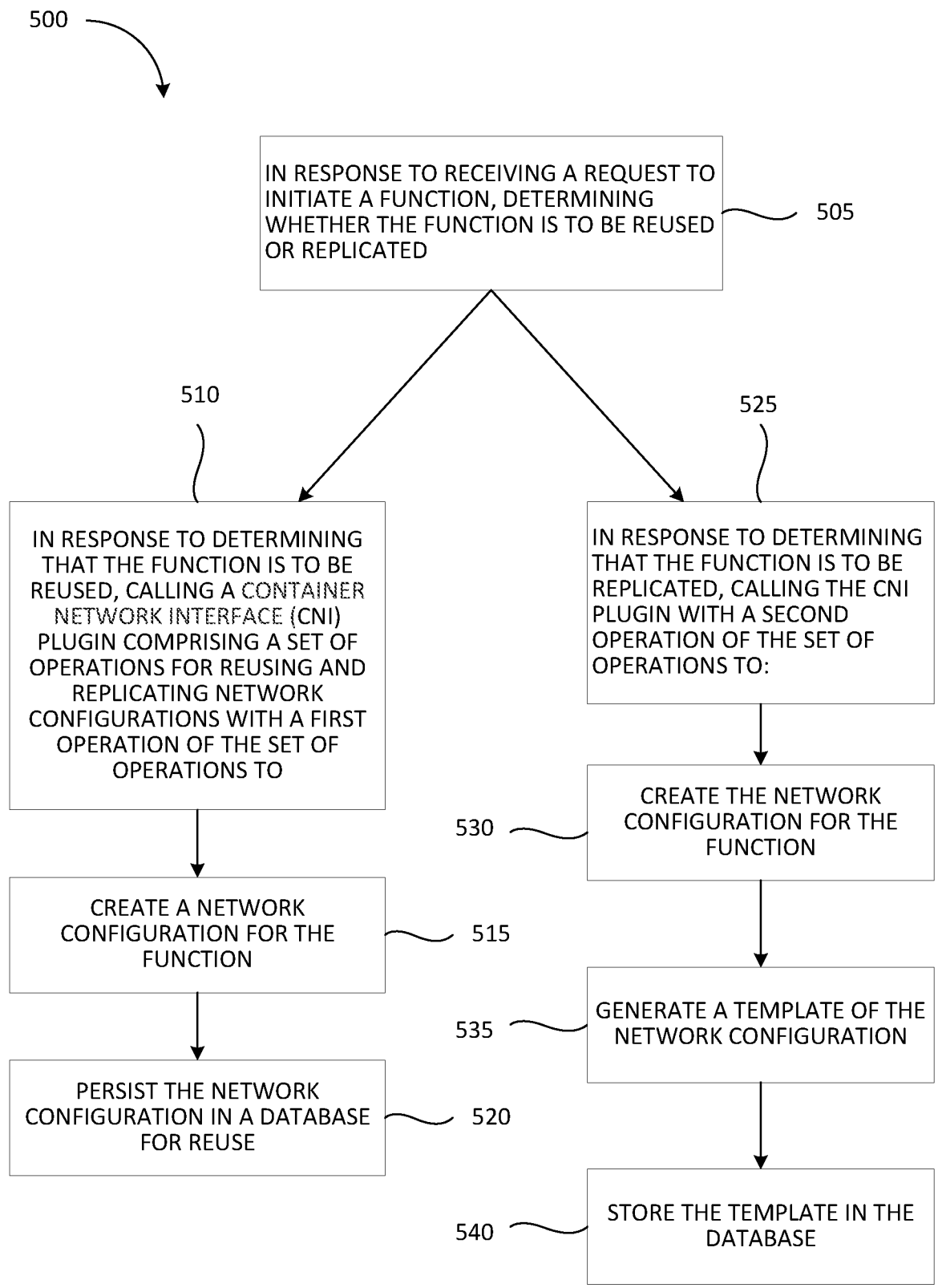
FIG. 5 is a flow diagram of a method for using a CNI specification that has been modified with annotations, operations, and policies to provide network configuration reuse, network configuration replication, and garbage collection functionality, in accordance with some embodiments of the present disclosure.

FIG. 5 is a flow diagram of a method 500 for using a CNI specification modified with annotations, operations, and policies to provide network configuration reuse, network configuration replication, and garbage collection functionality, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. in some embodiments, the method 500 may be performed by a computing device (e.g., computing device 110 illustrated in FIG. 2).

When a function is to be started on a pod, at block 505, the container runtime of the container host 214 may determine whether the function is to be reused or replicated which in turn will inform whether a network configuration for the function is to be persisted or made into a template. The container runtime of the container host 214 may determine that the network configuration should be persisted when a limited number of instances of the function, (e.g., 1 or 2 instances) are to run (i.e., the function is to be reused). In some embodiments, a limited number of instances may correspond to the number of instances that can run on a single pod. The container runtime of the container host 214 may determine that the network configuration should be made into a template when e.g., the function is going to be scaled to a large number of instances (i.e., the function is to be replicated). In some embodiments, a large number of instances may correspond to a number of instances that is greater than can run on a single pod and thus will be called many times across different pods and/or different compute nodes. Indeed, the use of templates in such situations is effective because when a function is to be scaled, each instance of the function is similar and the only difference is the pod or compute node on which the instance of the function will run.

FIG. 3A illustrates the system 200 in an example where the "persist" operation is used. The container host 214 may wish to start a function 240 and may determine that the function 240 will run on pod 220A on compute node 131A. At block 510, the container runtime of the container host 214 may determine that the function 240 is to be reused (e.g., will be called a limited number of times), and may call the CNI plugin 225 with the "persist" operation instead of a standard "create" operation. Using the "persist" operation, at block 515 the CNI plugin 225 may create the network configuration 245, persist it in the database 235 at block 520, and implement it on pod 220A, although the persisting of the network configuration 245 in the database 235 and the creation of the network configuration 245 on pod 220A may be decoupled. As discussed hereinabove, the network configuration 245 may be persisted in the database 235 in an inactive state and may be activated at a later time as needed.

As shown in FIG. 3B, once the pod 220A exits, the network configuration 245 may continue to exist in the database 235. If the container host 214 wishes to start another instance of the function 240 (shown as function 240A), the container runtime of the container host 214 may call the CNI plugin 225 with the "activate" operation. The "activate" operation may cause the CNI plugin 225 to activate on the compute node 131A, the network configuration 245 stored in the database 235.

At block 525, the container runtime of the container host 214 may determine that the function (now function 250 in FIG. 4A) is to be scaled to a large number of instances across various different compute nodes 131, and may call the CNI plugin 225 with the "template" operation instead of the standard "create" operation. Referring also to FIG. 4A, using the "template" operation, at block 530 the CNI plugin 225 may create the network configuration 255, and then at block 535 generate a template 260 comprising "meta rules" which specify a predefined set of operations (that do not on their own know where to execute) which are independent of a compute node on which the function 250 is to execute, and allow the template to accept as an input variable e.g., the compute node on which function 250 is to execute, in order to configure the template 260 (i.e., generate an actual network configuration) for that particular use. At block 540, the template 260 may then be persisted in the database 235 while the compute node 131A runs the function 250 with the network configuration 255.

As shown in FIG. 4B, the container host 214 may wish to start a second instance of the function 250 (shown as function 250A) and upon determining that the function 250A is to be started on compute node 131B, the container runtime of the container host 214 may call the CNI plugin 225 with the "generate" operation and specify the compute node 131B. Using the "generate" operation, the CNI plugin 225 may materialize the template 260 with the compute node the function 250A is to be started on (i.e., compute node 131B) to generate an actual network configuration 255A on compute node 131B. In this way, the container runtime of the container host 214 may generate a network configuration for any number of instances of the function 250 across any number of compute nodes 131.

Figure 6:
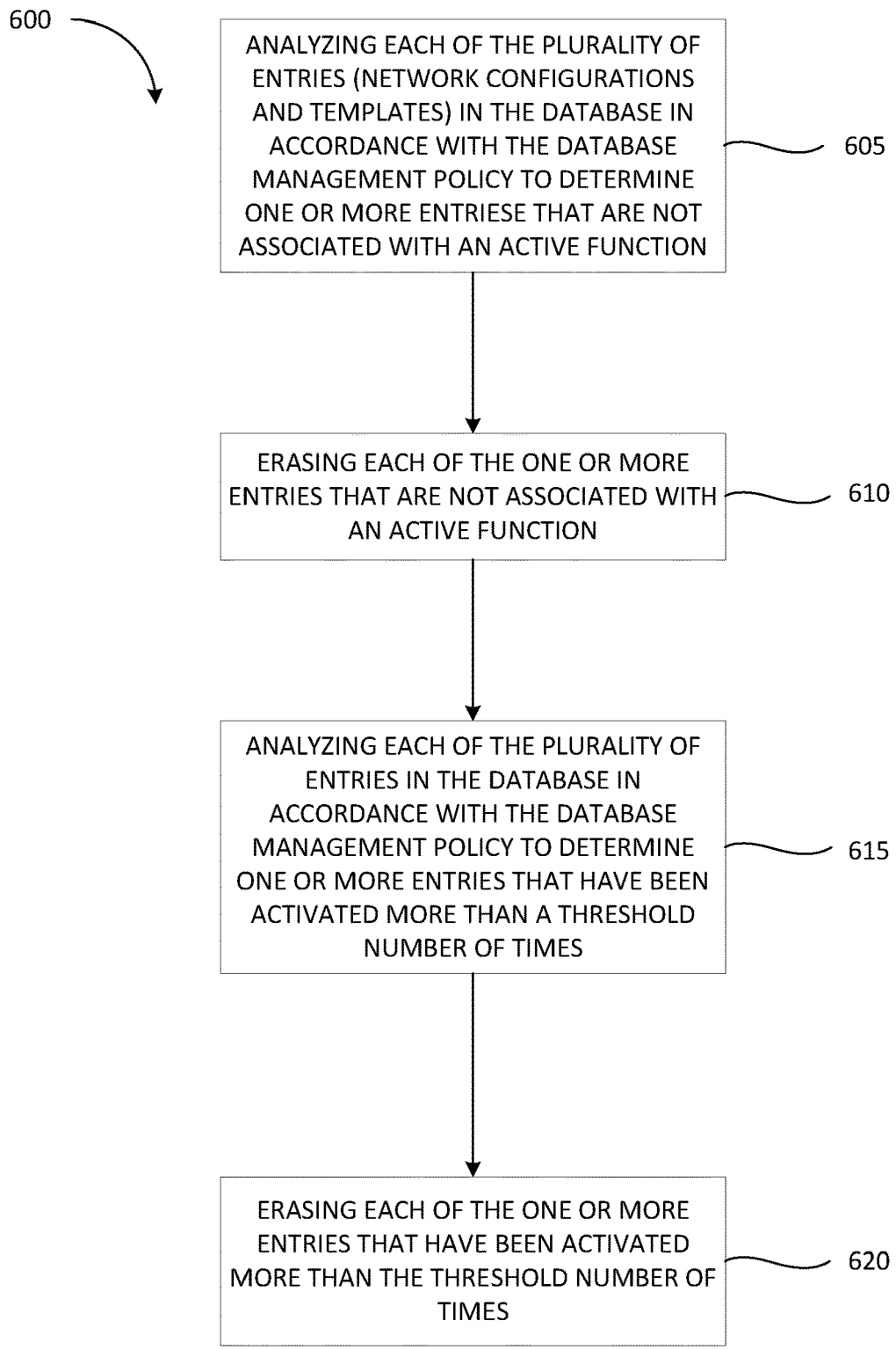
FIG. 6 is a block diagram of a method for performing network configuration database management using a set of policies of the modified CNI specification of FIG. 5, in accordance with some embodiments of the present disclosure.

FIG. 6 is a flow diagram of a method 600 for using a CNI specification modified with database management policies to provide management of network configurations stored/persisted in database 235 (also referred to as garbage collection functionality), in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. in some embodiments, the method 600 may be performed by a computing device (e.g., computing device 110 illustrated in FIG. 2).

The specification 230 may also include a database management policy, which provides criteria for when a network configuration or template that has been persisted in the database 235 should be erased. At block 605, the processing device 115 may analyze each of the plurality of entries in the database in accordance with the database management policy to determine one or more entries (network configurations or templates) that are not associated with an active function (e.g., by looking at the serverless function path). At block 610, the device 115 may erase each entry that is not associated with an active function. The database management policy may also provide criteria regarding the amount and complexity of the rules in the database 235, and if the number or complexity exceeds the criteria, then certain rules may be erased. At block 615, the processing device 115 may analyze each of the entries in the database in accordance with the database management policy to determine one or more entries that have been activated/materialized more than a threshold number of times. At block 620, the processing device 115 may erase each entry that has been activated/materialized more than the threshold number of times.

Figure 7:
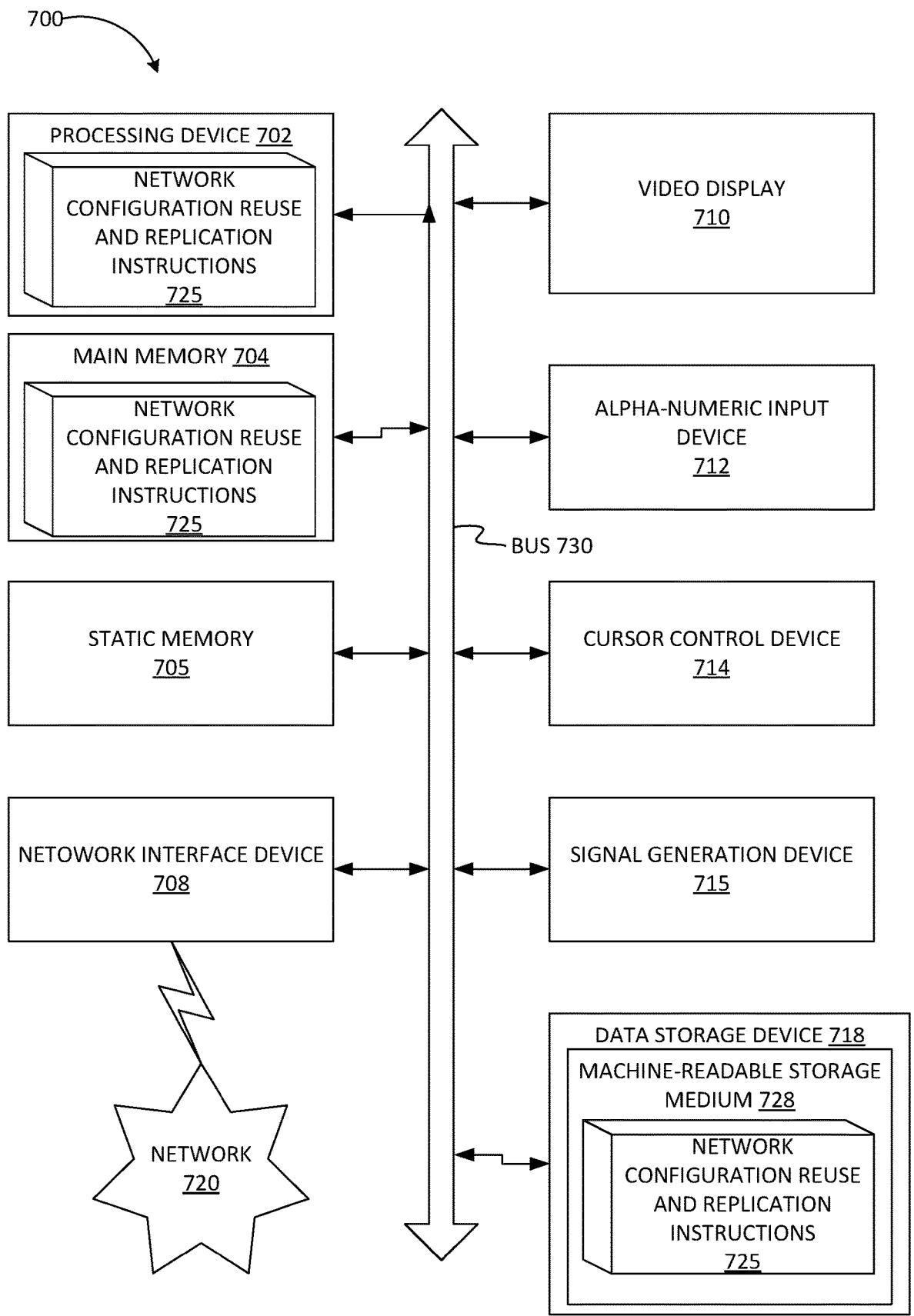
FIG. 7 is a block diagram of an example computing device that may perform one or more of the operations described herein, in accordance with some embodiments of the present disclosure.

FIG. 7 illustrates a diagrammatic representation of a machine in the example form of a computer system 700 within which a set of instructions, for causing the machine to perform any one or more of the methodologies discussed herein for intelligently scheduling pods.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718 which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute network configuration reuse and replication instructions 725, for performing the operations and steps discussed herein.

The data storage device 718 may include a machine-readable storage medium 728, on which is stored one or more sets of network configuration reuse and replication instructions 725 (e.g., software) embodying any one or more of the methodologies of functions described herein. The network configuration reuse and replication instructions 725 may also reside, completely or at least partially, within the main memory 704 or within the processing device 702 during execution thereof by the computer system 700; the main memory 704 and the processing device 702 also constituting machine-readable storage media. The network configuration reuse and replication instructions 725 may further be transmitted or received over a network 720 via the network interface device 708.

The machine-readable storage medium 728 may also be used to store instructions to perform a method for determining if a controller that can service a CRD exists, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Example 1 is a method comprising: in response to receiving a request to initiate a function, determining whether the function is to be reused or replicated; in response to determining that the function is to be reused, calling a container network interface (CNI) plugin comprising a set of operations for reusing and replicating network configurations with a first operation of the set of operations to: create a network configuration for the function; and persist the network configuration in a database for reuse; and in response to determining that the function is to be replicated, calling the CNI plugin with a second operation of the set of operations to: create the network configuration for the function; generate a template of the network configuration; and store the template in the database.

Example 2 is the method of example 1, wherein the first operation decouples the persisting of the network configuration in the database from implementation of the network configuration on a compute node such that requests to reuse the function do not recreate the network configuration.

Example 3 is the method of example 2, wherein the function is to be reused and the network configuration is persisted in the database in an inactive state, the method further comprising: in response to receiving a request to reuse the function, calling the CNI plugin with a third operation of the set of operations to activate the network configuration on a compute node on which the function is to be reused.

Example 4 is the method of example 1, wherein the template comprises a set of operations that are independent of a compute node on which they are to execute, and wherein the set of operations generate the network configuration in response to receiving as an input variable, the compute node on which they are to execute.

Example 5 is the method of example 4, wherein the function is to be replicated and the method further comprises: for each instance of the function: determining a compute node on which the instance of the function is to execute; and calling the CNI plugin with a third operation of the set of operations to generate the network configuration by inputting to the template the determined compute node on which the instance of the function is to execute.

Example 6 is the method of example 1, wherein the CNI plugin further comprises a database management policy and the database comprises a plurality of network configurations, the method further comprising: analyzing each of the plurality of network configurations in the database in accordance with the database management policy to determine one or more network configurations that are not associated with an active function; and erasing each of the one or more network configurations that are not associated with an active function.

Example 7 is the method of example 6, further comprising: analyzing each of the plurality of network configurations in the database in accordance with the database management policy to determine one or more network configurations that have been activated more than a threshold number of times; and erasing each of the one or more network configurations that have been activated more than the threshold number of times.

Example 8 is a system comprising: a memory; and a processing device operatively coupled to the memory, the processing device to: in response to receiving a request to initiate a function, determine whether the function is to be reused or replicated; in response to determining that the function is to be reused, call a container network interface (CNI) plugin comprising a set of operations for reusing and replicating network configurations with a first operation of the set of operations to: create a network configuration for the function; and persist the network configuration in a database for reuse; and in response to determining that the function is to be replicated, calling the CNI plugin with a second operation of the set of operations to: create the network configuration for the function; generate a template of the network configuration; and store the template in the database.

Example 9 is the system of example 8, wherein the first operation decouples the persisting of the network configuration in the database from implementation of the network configuration on a compute node such that requests to reuse the function do not recreate the network configuration.

Example 10 is the system of example 9, wherein the function is to be reused and the network configuration is persisted in the database in an inactive state, and the processing device is further to: in response to receiving a request to reuse the function, call the CNI plugin with a third operation of the set of operations to activate the network configuration on a compute node on which the function is to be reused.

Example 11 is the system of example 8, wherein the template comprises a set of operations that are independent of a compute node on which they are to execute, and wherein the set of operations generate the network configuration in response to receiving as an input variable, the compute node on which they are to execute.

Example 12 is the system of example 11, wherein the function is to be replicated and the processing device is further to: for each instance of the function: determine a compute node on which the instance of the function is to execute; and call the CNI plugin with a third operation of the set of operations to generate the network configuration by inputting to the template the determined compute node on which the instance of the function is to execute.

Example 13 is the system of example 8, wherein the CNI plugin further comprises a database management policy and the database comprises a plurality of network configurations, and the processing device is further to: analyze each of the plurality of network configurations in the database in accordance with the database management policy to determine one or more network configurations that are not associated with an active function; and erase each of the one or more network configurations that are not associated with an active function.

Example 14 is the system of example 13, wherein the processing device is further to: analyze each of the plurality of network configurations in the database in accordance with the database management policy to determine one or more network configurations that have been activated more than a threshold number of times; and erase each of the one or more network configurations that have been activated more than the threshold number of times.

Example 15 is a non-transitory computer-readable medium having instructions stored thereon which, when executed by a processing device, cause the processing device to: in response to receiving a request to initiate a function, determine whether the function is to be reused or replicated; in response to determining that the function is to be reused, call a container network interface (CNI) plugin comprising a set of operations for reusing and replicating network configurations with a first operation of the set of operations to: create a network configuration for the function; and persist the network configuration in a database for reuse; and in response to determining that the function is to be replicated, calling the CNI plugin with a second operation of the set of operations to: create the network configuration for the function; generate a template of the network configuration; and store the template in the database.

Example 16 is the non-transitory computer-readable medium of example 15, wherein the first operation decouples the persisting of the network configuration in the database from implementation of the network configuration on a compute node such that requests to reuse the function do not recreate the network configuration.

Example 17 is the non-transitory computer-readable medium of example 16, wherein the function is to be reused and the network configuration is persisted in the database in an inactive state, and the processing device is further to: in response to receiving a request to reuse the function, call the CNI plugin with a third operation of the set of operations to activate the network configuration on a compute node on which the function is to be reused.

Example 18 is the non-transitory computer-readable medium of example 15, wherein the template comprises a set of operations that are independent of a compute node on which they are to execute, and wherein the set of operations generate the network configuration in response to receiving as an input variable, the compute node on which they are to execute.

Example 19 is the non-transitory computer-readable medium of example 18, wherein the function is to be replicated and the processing device is further to: for each instance of the function: determine a compute node on which the instance of the function is to execute; and call the CNI plugin with a third operation of the set of operations to generate the network configuration by inputting to the template the determined compute node on which the instance of the function is to execute.

Example 20 is the non-transitory computer-readable medium of example 15, wherein the CNI plugin further comprises a database management policy and the database comprises a plurality of network configurations, and the processing device is further to: analyze each of the plurality of network configurations in the database in accordance with the database management policy to determine one or more network configurations that are not associated with an active function; and erase each of the one or more network configurations that are not associated with an active function.

Example 21 is the non-transitory computer-readable medium of example 20, wherein the processing device is further to: analyze each of the plurality of network configurations in the database in accordance with the database management policy to determine one or more network configurations that have been activated more than a threshold number of times; and erase each of the one or more network configurations that have been activated more than the threshold number of times.

Example 22 is a method comprising: providing a container network interface (CNI) specification comprising a set of operations for use by a CNI plugin to reuse and replicate network configurations; and in response to receiving a request to initiate a function, calling the CNI plugin with an operation of the set of operations, the operation selected based on whether the function is to be reused or replicated, and wherein the set of operations comprises: a first operation to decouple persisting of network configurations in a database from implementation of network configurations on a compute node; and a second operation to generate templates based on network configurations.

Example 23 is the method of example 22, wherein the function is to be reused, and the CNI plugin is called with the first operation to: generate a network configuration for the function; and persist the network configuration in the database, wherein requests to reuse the function do not recreate the network configuration.

Example 24 is the method of example 23, wherein the network configuration is persisted in the database in an inactive state, and the method further comprises: in response to receiving a request to reuse the function, call the CNI plugin with a third operation of the set of operations to activate the network configuration on a compute node on which the function is to be reused.

Example 25 is the method of example 22, wherein the function is to be replicated, and the CNI plugin is called with the second operation to: generate a network configuration for the function; and generate a template based on the network configuration, wherein the template comprises a set of operations that are independent of a compute node on which they are to execute, the set of operations to generate the network configuration in response to receiving as an input variable, the compute node on which they are to execute.

Example 26 is the method of example 25, further comprising: for each instance of the function to be replicated: determine a compute node on which the instance of the function is to execute; and call the CNI plugin with a third operation of the set of operations to generate the network configuration by inputting to the template the determined compute node on which the instance of the function is to execute.

Example 27 is the method of example 25, wherein the CNI specification further comprises a database management policy and the database comprises a plurality of network configurations, the processing device further to: analyze each of the plurality of network configurations in the database in accordance with the database management policy to determine one or more network configurations that are not associated with an active function; and erase each of the one or more network configurations that are not associated with an active function.

Example 28 is a non-transitory computer-readable medium having instructions stored thereon which, when executed by a processing device, cause the processing device to: providing a container network interface (CNI) specification comprising a set of operations for use by a CNI plugin to reuse and replicate network configurations; and in response to receiving a request to initiate a function, calling the CNI plugin with an operation of the set of operations, the operation selected based on whether the function is to be reused or replicated, and wherein the set of operations comprises: a first operation to decouple persisting of network configurations in a database from implementation of network configurations on a compute node; and a second operation to generate templates based on network configurations.

Example 29 is the non-transitory computer-readable medium of example 15, wherein the function is to be reused, and the processing device calls the CNI plugin with the first operation to: generate a network configuration for the function; and persist the network configuration in the database, wherein requests to reuse the function do not recreate the network configuration.

Example 30 is the non-transitory computer-readable medium of example 16 wherein the network configuration is persisted in the database in an inactive state, and the processing device is further to: in response to receiving a request to reuse the function, call the CNI plugin with a third operation of the set of operations to activate the network configuration on a compute node on which the function is to be reused.

Example 31 is the non-transitory computer-readable medium of example 15, wherein the function is to be replicated, and the processing device calls the CNI plugin with the second operation to: generate a network configuration for the function; and generate a template based on the network configuration, wherein the template comprises a set of operations that are independent of a compute node on which they are to execute, the set of operations to generate the network configuration in response to receiving as an input variable, the compute node on which they are to execute.

Example 32 is the non-transitory computer-readable medium of example 18, wherein the processing device is further to: for each instance of the function to be replicated: determine a compute node on which the instance of the function is to execute; and call the CNI plugin with a third operation of the set of operations to generate the network configuration by inputting to the template the determined compute node on which the instance of the function is to execute.

Example 33 is the non-transitory computer-readable medium of example 18, wherein the CNI specification further comprises a database management policy and the database comprises a plurality of network configurations, the processing device further to: analyze each of the plurality of network configurations in the database in accordance with the database management policy to determine one or more network configurations that are not associated with an active function; and erase each of the one or more network configurations that are not associated with an active function.

Example 34 is a system comprising: means for determining, in response to receiving a request to initiate a function, whether the function is to be reused or replicated; means for calling, in response to determining that the function is to be reused, a container network interface (CNI) plugin comprising a set of operations for reusing and replicating network configurations with a first operation of the set of operations to: create a network configuration for the function; and persist the network configuration in a database for reuse; and in response to determining that the function is to be replicated, calling the CNI plugin with a second operation of the set of operations to: create the network configuration for the function; generate a template of the network configuration; and store the template in the database.

Example 35 is the system of example 34, wherein the first operation decouples the persisting of the network configuration in the database from implementation of the network configuration on a compute node such that requests to reuse the function do not recreate the network configuration.

Example 36 is the system of example 35, wherein the function is to be reused and the network configuration is persisted in the database in an inactive state, and the system further comprises: means for calling, in response to receiving a request to reuse the function, the CNI plugin with a third operation of the set of operations to activate the network configuration on a compute node on which the function is to be reused.

Example 37 is the system of example 34, wherein the template comprises a set of operations that are independent of a compute node on which they are to execute, and wherein the set of operations generate the network configuration in response to receiving as an input variable, the compute node on which they are to execute.

Example 38 is the system of example 37, wherein the function is to be replicated and the system further comprises: means for determining, for each instance of the function, a compute node on which the instance of the function is to execute; and means for calling the CNI plugin with a third operation of the set of operations to generate the network configuration by inputting to the template the determined compute node on which the instance of the function is to execute.

Example 39 is the system of example 34, wherein the CNI plugin further comprises a database management policy and the database comprises a plurality of network configurations, and the system further comprises: means for analyzing each of the plurality of network configurations in the database in accordance with the database management policy to determine one or more network configurations that are not associated with an active function; and means for erasing each of the one or more network configurations that are not associated with an active function.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   in response to receiving a request to initiate a function, determining whether the function is to be reused or replicated;
   in response to determining that the function is to be reused, calling a container network interface (CNI) plugin comprising a set of operations for reusing and replicating network configurations, wherein the CNI plugin is called with a first operation of the set of operations to:
   create a network configuration for the function; and
   persist the network configuration in a database for reuse; and
   in response to determining that the function is to be replicated, calling the CNI plugin with a second operation of the set of operations to:
   create the network configuration for the function;
   generate a template of the network configuration; and
   store the template in the database, wherein the template comprises a predefined set of operations that are independent of a compute node on which the predefined set of operations are to execute, and wherein the predefined set of operations generate the network configuration in response to receiving as an input variable, the compute node on which the predefined set of operations are to execute.

2. The method of claim 1, wherein the persisting of the network configuration in the database is decoupled from the creation of the network configuration to prevent requests to reuse the function from recreating the network configuration.

3. The method of claim 2, wherein the function is to be reused and the network configuration is persisted in the database in an inactive state, the method further comprising:
in response to receiving a request to reuse the function, calling the CNI plugin with a third operation of the set of operations to activate the network configuration on a compute node on which the function is to be reused.

4. The method of claim 1 wherein the function is to be replicated and the method further comprises:
for each instance of the function:
determining a compute node on which the instance of the function is to execute; and
calling the CNI plugin with a third operation of the set of operations to generate the network configuration by inputting to the template the determined compute node on which the instance of the function is to execute.

5. The method of claim 1, wherein the CNI plugin further comprises a database management policy and the database comprises a plurality of network configurations, the method further comprising:
analyzing each of the plurality of network configurations in the database in accordance with the database management policy to determine one or more network configurations that are not associated with an active function; and erasing each of the one or more network configurations that are not associated with an active function.

6. The method of claim 5, further comprising:
analyzing each of the plurality of network configurations in the database in accordance with the database management policy to determine one or more network configurations that have been activated more than a threshold number of times; and
erasing each of the one or more network configurations that have been activated more than the threshold number of times.

7. A system comprising:
a memory; and
a processing device operatively coupled to the memory, the processing device to:
in response to receiving a request to initiate a function, determine whether the function is to be reused or replicated;
in response to determining that the function is to be reused, call a container network interface (CNI) plugin comprising a set of operations for reusing and replicating network configurations, wherein the CNI plugin is called with a first operation of the set of operations to:
create a network configuration for the function; and
persist the network configuration in a database for reuse; and
in response to determining that the function is to be replicated, call the CNI plugin with a second operation of the set of operations to:
create the network configuration for the function;
generate a template of the network configuration; and
store the template in the database, wherein the template comprises a predefined set of operations that are independent of a compute node on which the predefined set of operations are to execute, and wherein the predefined set of operations generate the network configuration in response to receiving as an input variable, the compute node on which the predefined set of operations are to execute.

8. The system of claim 7, wherein the processing device decouples persisting of the network configurations in the database from the creation of the network configuration to prevent requests to reuse the function from recreating the network configuration.

9. The system of claim 8, wherein the function is to be reused and the network configuration is persisted in the database in an inactive state, and the processing device is further to:
in response to receiving a request to reuse the function, call the CNI plugin with a third operation of the set of operations to activate the network configuration on a compute node on which the function is to be reused.

10. The system of claim 7, wherein the function is to be replicated and the processing device is further to:
for each instance of the function:
determine a compute node on which the instance of the function is to execute; and
call the CNI plugin with a third operation of the set of operations to generate the network configuration by inputting to the template the determined compute node on which the instance of the function is to execute.

11. The system of claim 7, wherein the CNI plugin further comprises a database management policy and the database comprises a plurality of network configurations, and the processing device is further to:
analyze each of the plurality of network configurations in the database in accordance with the database management policy to determine one or more network configurations that are not associated with an active function; and
erase each of the one or more network configurations that are not associated with an active function.

12. The system of claim 11, wherein the processing device is further to:
analyze each of the plurality of network configurations in the database in accordance with the database management policy to determine one or more network configurations that have been activated more than a threshold number of times; and
erase each of the one or more network configurations that have been activated more than the threshold number of times.

13. A non-transitory computer-readable medium having instructions stored thereon which, when executed by a processing device, cause the processing device to:
in response to receiving a request to initiate a function, determining whether the function is to be recused or replicated;
in response to determining that the function is to be reused, calling a container network interface (CNI) plugin comprising a set of operations for reusing and replicating network configurations, wherein the CNI plugin is called with a first operation of the set of operations to:
create a network configuration for the function; and
persist the network configuration in a database for reuse; and
in response to determining that the function is to be replicated, calling the CNI plugin with a second operation of the set of operations to:
create the network configuration for the function;
generate a template of the network configuration; and store the template in the database, wherein the template comprises a predefined set of operations that are independent of a compute node on which the predefined set of operations are to execute, and wherein the predefined set of operations generate the network configuration in response to receiving as an input variable, the compute node on which the predefined set of operations are to execute.

14. The non-transitory computer-readable medium of claim 13 wherein the network configuration is persisted in the database in an inactive state, and the processing device is further to:
 in response to receiving a request to reuse the function, call the CNI plugin with a third operation of the set of operations to activate the network configuration on a compute node on which the function is to be reused.

15. The no-transitory computer-readable medium of claim 13, wherein the processing device is further to:
 for each instance of the function to be replicated:
  determine a compute node on which the instance of the function is to execute; and
  call the CNI plugin with a third operation of the set of operations to generate the network configuration by inputting to the template the determined compute node on which the instance of the function is to execute.

16. The non-transitory computer-readable medium of claim 13, wherein the CNI plugin further comprises a database management policy and the database comprises a plurality of network configurations, the processing device further to:
 analyze each of the plurality of network configurations in the database in accordance with the database management policy to determine one or more network configurations that are not associated with an active function; and
 erase each of the one or more network configurations that are not associated with an active function.

17. The non-transitory computer-readable medium of claim 13, wherein the processing device decouples persisting of the network configuration in the database from the generation of the network configuration to prevent requests to reuse the function from recreating the network configuration.

\* \* \* \* \*